April 7, 1925.
C. O. HALL
1,532,402
ELECTRIC FAN
Filed Jan. 15, 1924.
2 Sheets-Sheet 2
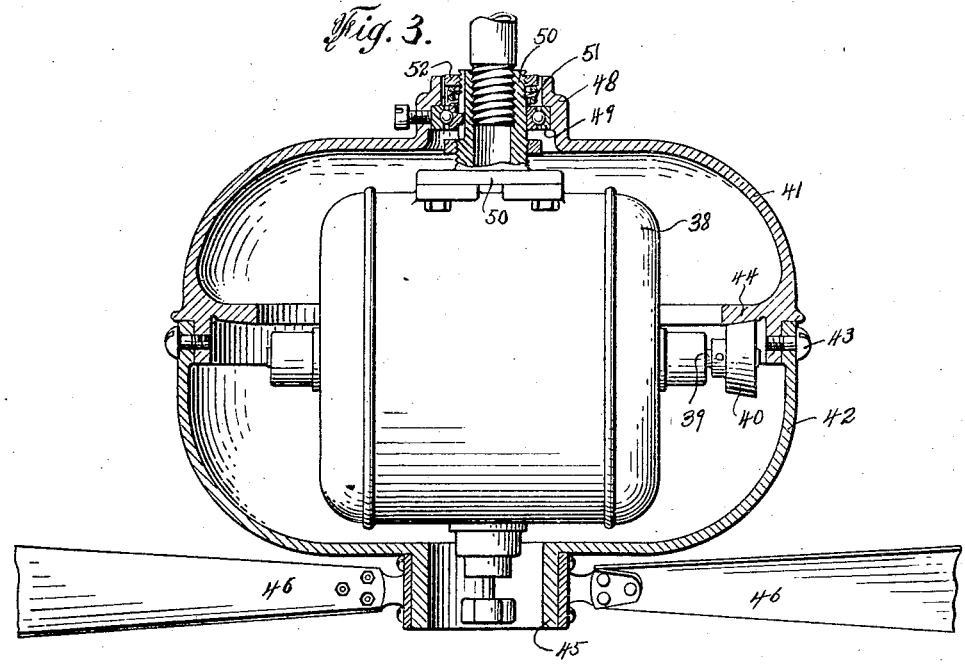
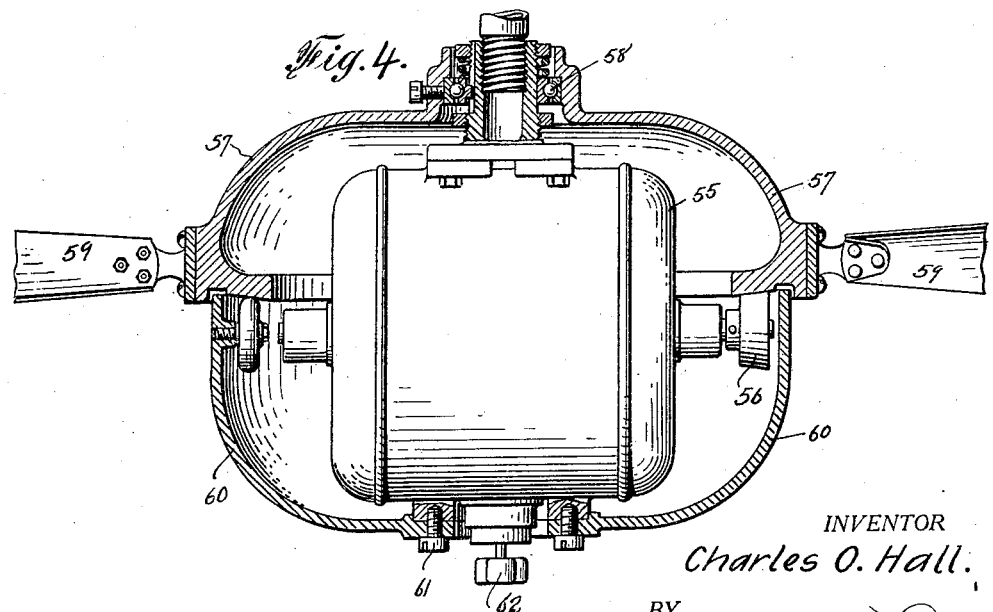
INVENTOR
Charles O. Hall.
BY
ATTORNEYS Patented Apr. 7, 1925.

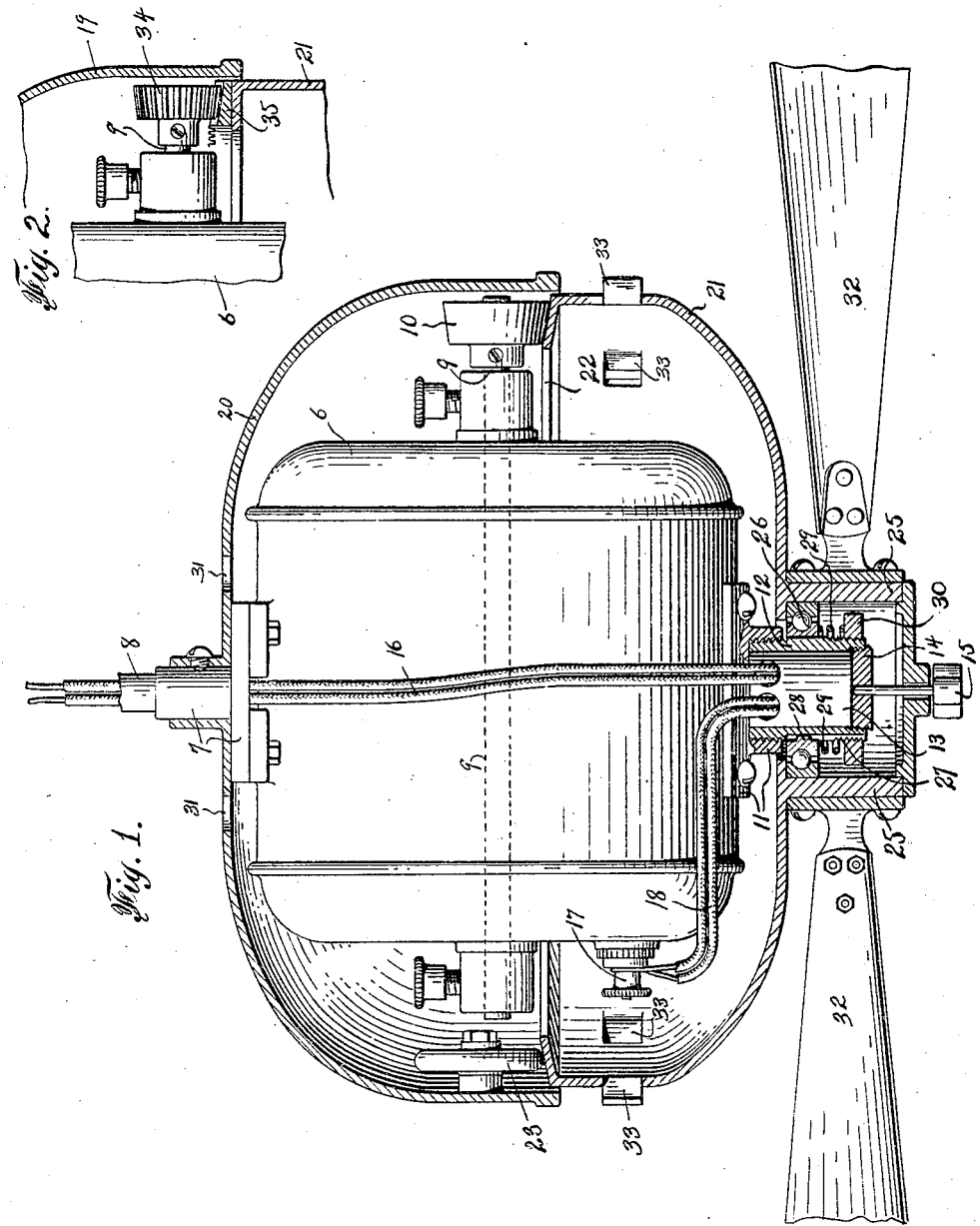

1,532,402

UNITED STATES PATENT OFFICE.

CHARLES O. HALL, OF EAST ORANGE, NEW JERSEY.

ELECTRIC FAN.

Application filed January 15, 1924. Serial No. 686,273.

*To all whom it may concern:*

Be it known that I, CHARLES O. HALL, a citizen of the United States, residing at East Orange, in the county of Essex and State of New Jersey, have invented certain new and useful Improvements in Electric Fans, of which the following is a specification.

This invention relates to electric fans, and more particularly to fan motor construction in respect to ceiling fans and others having preferably slowly rotating fan blades.

An object of the invention is to produce a fan capable of being driven at relatively slow speed and which fan may comprise a small size lightweight high-speed motor in order that heavyweight slow-speed and large size electric fan motors may be discontinued from use.

Another object of the invention is to produce an electric fan of simple and rugged construction which is inexpensive to manufacture, and which may, in part, be manufactured by utilizing standard electric motors; and I illustrate a motor mounted as usual with the drive shaft in a horizontal plane and driving through a differential reduction transmission to slowly revolve a fan.

The accompanying drawings illustrate preferred forms of the invention, serving to illustrate the structure, principle and mode of operation thereof.

Figure 1 illustrates a partial vertical section of the electric fan serving to show the enclosed driving mechanism; and Figure 2 shows a modified form of the driving mechanism as employed between the small high-speed motor and the slow-speed fan blades.

Figure 3 illustrates a modified form of the invention and shows improvements in respect to the fan motor housing and driving mechanism.

Figure 4 shows another modified form of the invention.

Referring now more particularly to Figures 1 and 2 for a detailed description of the invention, there is shown an electric motor 6 having a suspension or mounting bracket or flange 7 fixed to a suspension pipe 8. The suspension member 8 is broken away, but it is understood how it may be fixed to a ceiling to support the fan at a suitable distance from the ceiling. The motor 6 is provided as usual, with a shaft 9 which is fitted with a drive member 10.

The lower part of the motor carries a flange 11 in which is anchored a nipple or tube 12; and a switch housing 13 is held within the nipple 12 by a closure plug 14, the usual switch or rheostat parts being contained within the said insulating housing 13 with a switch button 15 connecting therewith and adapted to stop and start the motor in the usual way. Lead in electric wires 16 pass through the switch housing 13 for the purpose of transmitting current to the motor terminals 17 through circuit wires 18. A semi-spherical housing 20 may be fixed to the flange 7 and reaches downwardly over the drive roller 10 to enclose the driving transmission parts. A lower semi-spherical driver housing part 21 is provided with a driving flange or ring 22 held in frictional engagement with the drive pulley 10 and is adapted to be rotated at a speed somewhat reduced from that of the motor itself. An idle balancing roller 23 may be journaled on the upper housing part 20 and runs freely in engagement with the driving ring 22, the said idler 23 being preferably disposed diametrically opposite the driving roller or wheel 10. This idle roller 23 serves to hold the transmission parts in alignment and prevents side strain to produce an efficient driving action without wear or vibration of the parts.

The lower semi-spherical driver housing 21 is provided with a hub 25 which carries a ball bearing 26 interposed between the rotating hub 25 and the fixed or stationary nipple 12, and thus when the lower housing driver 21 is in operation, the ball bearing 26 provides an efficient smooth and noiseless journal upon which the parts rotate. The ball bearing 26 may have its outer race fixed in the hub 25 with the inner race thereof slidable up and down on the nipple 12 which permits, while in operation, the lower housing part 21 together with its ball bearing 26 to undergo slightly adjusted vertical movement up and down in relation to the fixed motor part 12. A slot 27 may be cut in the stationary nipple 12 and affords a track or guideway in which an ear 28 on the ball bearing 26 may slide thus restraining the inner race of the ball bearing from rotation yet at the same time permitting it to undergo vertical movement. A take-up spring or cushion 29 is confined on the nipple 12 against the ball bearing 26 with a nut 30 fixed on the lower end of the nipple; and this spring acts to lift upwardly on the housing 21 whereby the driving ring 22 is held in constant and uniformly frictional engagement with the driving member 10. The nut is turned up or down to increase or decrease the frictional driving contact between the driving and driven members.

Fan blades 32 are fixed to the hub 25, and it is observed how the revolutions per minute of the said fan 32 are substantially reduced in comparison to the revolutions per minute of the electric motor shaft 9 and driving part 10. The blades 32 may be mounted at any convenient place on the driven housing 21.

Figure 2 shows a drive pinion 34 engaging a ring gear 35, the said gear 35 being fixed to the lower drive housing part 21, and the operation of which produces a smooth and relatively low-speed positive drive for the fan. Either the frictional drive member 10 or positive gear 34 may be used to quickly bring the speed of the fan up to normal depending upon the wishes of the manufacturer as to which form of transmission is most desirable.

Ventilating air inlets 31 are made in the stationary part of the housing and air wings 33 are punched out from the rotating housing for the purpose of producing a flow of air down through the housing over the motor.

The advantage in a fan construction of this character resides in the fact that a high-speed electric motor 6 of standard construction may be employed for the purpose of manufacturing slow-speed ceiling fans having a large air sweep thus avoiding the very considerable weight usually existing in ceiling fans of present-day use. The housing parts 20 and 21 enclose the operating mechanism and protect the same from dust, while at the same time the housing adds to the appearance of the fan. The design of the housing 20—21 is such that a relatively small mass is rotated, for it is observed that the lower housing element 21 rotates while the upper part 20 thereof remains stationary. This construction and arrangement of parts provides an easy stopping and starting movement.

Referring now to Figure 3 for a description of a modified form of the invention there is illustrated a standard electric motor 38 equipped with the usual form of drive shaft 39 and a drive roller 40 fixed thereon. A unitary housing, made in the form of an upper section 41 and lower section 42, is preferably fastened together with screws 43 in order that the parts may be readily assembled and disassembled, and a driving ring 44 is carried by one of the housing parts and rests in cushioned and frictional engagement with the roller 40. The lower part of the housing is made with a hub 45 and fan blades 46 are fixed thereto; and the electric switch may be installed on the motor at this convenient point and be made accessible through the hub.

The upper part of the housing is made with a bearing housing 48 in which a ball bearing 49 is fixed and adapted to move up and down in relation to the motor support bracket 50. A spring cushion 51 is confined between an adjusting nut 52 and the ball bearing 49 thereby insuring the engagement of the roller 40 and drive flange 44. The action of the spring 51 serves to hold the friction drive parts in suitable driving engagement against the upward lift or thrust produced by the movement of the fan blades 46 through the air.

Referring now to Figure 4 for a description of a slightly different form of construction, there is illustrated an electric motor 55 with a drive roller 56 engaging the upper revolving housing part 57, which housing is rotatably supported on a ball bearing 58 in the same manner as hereinbefore described. Fan blades 59 are fixed to the periphery of the driving housing 57 thereby locating the said fans at a point substantially midway of the housing. This improvement in the manner of mounting the fan blades 59 enables the manufacturer to use relatively short fan blades. A lower housing part 60 is fixed with screws 61 to the motor frame, and the usual form of switch button 62 is accessible for starting and stopping the motor. In this form of the invention the lower housing part is stationary while the upper part rotates and the weight of the upper part urges the driving members 56 and 57 together.

The improved two part housing is so constructed that the rotating part fits up closely to the stationery part thereby providing a closed housing. The invention is presented to fulfill certain needs felt in respect to less expensive and light weight ceiling fans.

What I claim is:

1. An electric fan construction comprising in combination, a motor, a drive member attached thereto, a housing arranged around the motor engaging the driving member and rotated thereby, a fan carried by the housing, and a cushion member arranged to urge the housing and drive member together.

2. An electric fan comprising in combination a motor, a housing enclosing the motor, a motor support extending through the housing by which the fan is suspended in operative position, a driving transmission by which the motor rotates the housing, fan blades carried by the rotating housing, and an idle balancing pulley journaled on a fixed part and running against the housing to balance the transmission and prevent vibration.

3. An electric fan comprising in combination, a motor, a housing enclosing the motor, a motor support extending through the housing by which the fan is suspended in operative position, a driving transmission by which the motor rotates the housing, fan blades carried by the rotating housing, a part of the housing being mounted stationary on the motor, and an idle roller carried by the stationary housing part and rolling upon the rotating housing part.

4. An electric fan comprising in combination a motor, a housing enclosing the motor, a motor support extending through the housing by which the fan is suspended in operative position, a driving transmission by which the motor rotates the housing, fan blades carried by the rotating housing, a part of the housing being mounted stationary on the motor, an idle roller carried by the stationary housing part and rolling upon the rotating housing part, ventilating inlets made in the fixed housing, and exhausting outlets in the rotating housing where air is drawn through the housing around the motor.

5. A fan construction comprising in combination, an electric motor having a drive shaft, a driving member fixed to the shaft, a semi-spherical housing arranged in a covering relation with the motor, a bearing carried by the motor and supporting said housing, a driven ring carried by the housing and engaging the aforesaid driving member, fan blades carried by the housing, and an idler member mounted in fixed relation to the motor and rolling on the driven ring.

6. An electric fan construction comprising in combination, a motor having a drive shaft, a driving member fixed on the shaft, a semi-spherical housing fixed stationary on the motor and fitting down over the shaft and driving member, a rotatable housing fitting around the stationary housing, a bearing carried by the motor on which the rotatable housing is journaled, a driven ring carried by the rotatable housing and engaging the aforesaid driving member, fan blades fixed to the rotatable housing, an idler roller mounted on the stationary housing part and rolling against the driven ring, ventilating inlets in the stationary housing, and ventilating exhausting outlet blades in the rotatable housing to draw air over the motor through the housing.

7. A fan construction comprising in combination, an electric motor having a drive shaft, a driving member fixed to the shaft, a semi-spherical housing arranged in a covering relation with the motor, a bearing carried by the motor and supporting said housing, a driven ring carried by the housing and engaging the aforesaid driving member, fan blades carried by the housing, a hub made on the lower part of the housing by which the fan blades are fixed to the housing and in which the aforesaid bearing is carried.

8. A fan construction comprising in combination, an electric motor having a drive shaft, a driving member fixed to the shaft, a semi-spherical housing arranged in a covering relation with the motor, a bearing carried by the motor and supporting said housing, a driven ring carried by the housing and engaging the aforesaid driving member, fan blades carried by the housing, a hub made on the lower part of the housing by which the fan blades are fixed to the housing and in which the aforesaid bearing is carried, and electric switch parts protected by the said hub.

9. An electric fan construction comprising in combination, a motor, a driving member carried on the motor, a pair of semi-spherical housing parts secured together and enclosing the motor and driving parts, a bearing carried by the motor and rotatably supporting the housing, a driven ring carried by the housing and engaging the driving member, a hub formed on the housing, a switch carried by the motor and projecting through the hub.

10. An electric fan construction comprising in combination, a motor, a fan blade carrier journaled thereon, fan blades fixed to the carrier, a driven ring made on the fan carrier, a horizontal drive shaft carried by the motor, a driving member carried by the shaft engaging the ring, a switch to stop and start the motor, and a cushion device arranged to urge the driving member and driven ring together in frictional driving engagement.

11. An electric fan construction comprising in combination, a motor, a fan blade carrier journaled thereon, fan blades fixed to the carrier, a driven ring made on the fan carrier, a horizontal drive shaft carried by the motor, a driving member carried by the shaft engaging the ring, a switch to stop and start the motor, a cushion device arranged to urge the driving member and driven ring together in frictional driving engagement, a housing partly enclosing the motor and driving mechanism, and an idle roller journaled on the housing and rolling against the blade carrier ring to provide a positive balanced drive.

12. An improved electric fan comprising in combination, an electric motor carrying an armature shaft disposed horizontally, a driving wheel fixed on one end of the horizontal shaft, a housing enclosing the motor, a driven ring formed on the housing and engaged and driven by the aforesaid driving wheel, fan blades attached to the housing, and a bearing interposed between the housing and motor.

In testimony whereof I affix my signature.

CHARLES O. HALL.